United States Patent
Cavalieri et al.

(10) Patent No.: US 12,365,789 B2
(45) Date of Patent: Jul. 22, 2025

(54) COMPOSITIONS OBTAINED FROM RECYCLED POLYOLEFINS

(71) Applicant: BASELL POLIOLEFINE ITALIA S.R.L., Milan (IT)

(72) Inventors: Claudio Cavalieri, Ferrara (IT); Emanuele Burgin, Ferrara (IT); Monica Galvan, Ferrara (IT); Thomas Boehm, Darmstadt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 563 days.

(21) Appl. No.: 17/801,310

(22) PCT Filed: Feb. 4, 2021

(86) PCT No.: PCT/EP2021/052610
§ 371 (c)(1),
(2) Date: Aug. 22, 2022

(87) PCT Pub. No.: WO2021/165045
PCT Pub. Date: Aug. 26, 2021

(65) Prior Publication Data
US 2023/0099166 A1    Mar. 30, 2023

(30) Foreign Application Priority Data
Feb. 21, 2020    (EP) .................................... 20158707

(51) Int. Cl.
*C08L 23/12*    (2006.01)
(52) U.S. Cl.
CPC ......... *C08L 23/12* (2013.01); *C08L 2205/035* (2013.01); *C08L 2207/20* (2013.01)

(58) Field of Classification Search
CPC ....................................... C08L 23/12
USPC ........................................... 523/204
See application file for complete search history.

(56) References Cited

U.S. PATENT DOCUMENTS

2009/0048403 A1    2/2009    Costantini et al.

FOREIGN PATENT DOCUMENTS

| EP | 3165473 A1 | 5/2017 | |
|---|---|---|---|
| WO | 2018206353 A1 | 11/2018 | |
| WO | WO-2019086359 A1 * | 5/2019 | .............. C08L 23/12 |
| WO | WO-2019091885 A1 * | 5/2019 | .............. C08L 23/06 |
| WO | 2019224129 | 11/2019 | |

OTHER PUBLICATIONS

International Search Report and Written Opinion Mailed Mar. 5, 2021 (Mar. 5, 2021) for corresponding PCT/EP2021/052610.

* cited by examiner

*Primary Examiner* — Deve V Hall

(57) ABSTRACT

A polypropylene composition made from or containing:
T1) 35-65 wt % of a recycled polypropylene mixture containing at least 80 wt % of rigid polypropylene items and having a purity of at least 90 wt %;
T2) 20-50 wt % of an ethylene/propylene copolymer;
T3) 5-20 wt % of a propylene/ethylene heterophasic copolymer composition made from or containing
  a) from 12 wt % to 52 wt % of a propylene homopolymer or a propylene/ethylene copolymer; and
  b) from 48 wt % to 88 wt % of a propylene/ethylene copolymer having a content of ethylene derived units ranging from 15 wt % to 42 wt %;
wherein the propylene composition has a melt flow rate (ISO 1133 230° C./2.16 kg) ranging from 0.5 to 20 g/10 min.

15 Claims, No Drawings

COMPOSITIONS OBTAINED FROM RECYCLED POLYOLEFINS

This application is the U.S. National Phase of PCT International Application PCT/EP2021/052610, filed Feb. 4, 2021, claiming benefit of priority to European Patent Application No. 20158707.8, filed Feb. 21, 2020, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to compositions containing recycled polypropylene.

BACKGROUND OF THE INVENTION

Polyolefins are consumed for applications, including packaging for food and other goods, fibers, automotive components, and manufactured articles. The quantity of polyolefins raises concerns for the environmental impact of the waste materials generated after the first use of the polyolefins.

Waste plastic materials are coming from differential recovery of municipal plastic wastes. In some instances, municipal plastic waste includes flexible packaging (cast film, blown film and BOPP film), rigid packaging, blow-molded bottles, and injection-molded containers. Through a step of separation from other polymers polyolefin fractions are obtained. The polyolefin fractions include polyethylene and polypropylene polymers. In some instances, the polyethylene polymers are HDPE, LDPE, or LLDPE. In some instances, the polypropylene polymers are homopolymers, random copolymers, or heterophasic copolymers.

In some instances, the recovered fractions have poor mechanical and physical features, thereby prohibiting the reuse of the fractions in industrial processes.

SUMMARY OF THE INVENTION

In a general embodiment, the present disclosure provides a polypropylene composition made from or containing:
T1) 35-65 wt % of a recycled polypropylene mixture containing at least 80 wt % of rigid polypropylene items and having a purity of at least 90 wt %, wherein the remaining 10 wt % is made from or containing other polymers, paper, cardboard, carton, aluminized plastic, and textiles; wherein the recycled polypropylene mixture has a melt flow rate (ISO 1133 230° C./2.16 kg) ranging between 2 and 30 g/10 min and a melting point measured by DSC ranging from 148° C. to 162° C.;
T2) 20-50 wt % of an ethylene/propylene copolymer having
i) a content of ethylene derived units between 1.0 wt % and 8.0 wt %;
(ii) a melting temperature ranging from 135° C. to 155° C.;
(iii) a melt flow rate (230° C./5 kg. ISO 1133) ranging from 0.2 g/10 min to 3.5 g/10 min; and
(iv) xylene solubles at 25° C. ranging from 10.0 wt % to 4.0 wt %; and
T3) 5-20 wt % of a propylene/ethylene heterophasic copolymer composition having an intrinsic viscosity on a xylene soluble fraction measured at 25° C. ranging from 2.5 dl/g to 4.5 dl/g and made from or containing:
a) from 12 wt % to 52 wt % of a propylene homopolymer or a propylene/ethylene copolymer having a content of ethylene derived units ranging from 0.1 wt % to 4.5 wt %; and having a xylene soluble content measured at 25° C. lower than 10 wt %; and
b) from 48 wt % to 88 wt % of a propylene/ethylene copolymer having a content of ethylene derived units ranging from 15 wt % to 42 wt %;
wherein the propylene composition has a melt flow rate (ISO 1133 230° C./2.16 kg) ranging from 0.5 to 20 g/10 min;
the sum of the amount of a) and b), being referred to the total weight % of a) and b) being 100 wt %; and
the sum of the amount of T1), T2) and T3), being referred to the total weight % of T1), T2), and T3) being 100 wt %.

DETAILED DESCRIPTION OF THE INVENTION

In some embodiments, the present disclosure provides a polypropylene composition made from or containing:
T1) 35-65 wt %; alternatively from 40-60 wt %; alternatively from 45-55 wt %, of a recycled polypropylene mixture containing at least 80 wt %, alternatively at least 85 wt %, alternatively at least 90 wt %, of rigid polypropylene items and having a purity of at least 90 wt %; alternatively at least 92 wt %, alternatively at least 94 wt %, wherein the remaining 10 wt %; alternatively 8 wt %; alternatively 6 wt %, is made from or containing other polymers, paper, cardboard, carton, aluminized plastic, and textiles; wherein the recycled polypropylene mixture has a melt flow rate (ISO 1133 230° C./2.16 kg) ranging between 2 and 30 g/10 min; alternatively between 3 and 25 g/10 min; alternatively between 5 and 20 g/10 min, and a melting point measured by DSC ranging from 148° C. to 162° C.;
T2) 20-50 wt %, alternatively 25-45 wt %; alternatively 32-42 wt %, of an ethylene propylene copolymer having:
i) a content of ethylene derived units between 1.0 wt % and 8.0 wt %; alternatively from 2.0 wt % to 6.0 wt %; alternatively from 3.0 wt % to 5.0 wt %;
(ii) a melting temperature ranging from 135° C. to 155° C.;
(iii) a melt flow rate (230° C./5 kg. ISO 1133) ranging from 0.2 g/10 min to 3.5 g/10 min; alternatively from 0.6 g/10 min to 2.0 g/10 min; and
(iv) xylene solubles at 25° C. ranges from 10.0 wt % to 4.0 wt %; alternatively from 9.0 wt % to 6.0 wt %; and
T3) 5-20 wt %; alternatively 7-15 wt %, alternatively 8-13 wt % of a propylene/ethylene heterophasic copolymer composition having an intrinsic viscosity on a xylene soluble fraction measured at 25° C. ranges from 2.5 dl/g to 4.5 dl/g; alternatively from 2.8 dl/g to 4.0 dl/g.;
wherein T3 is made from or containing
a) from 12 wt % to 52 wt %; alternatively from 15 wt % to 43 wt %; alternatively from 20 wt % to 33 wt %, of a propylene homopolymer or a propylene/ethylene copolymer having a content of ethylene derived units ranging from 0.1 wt % to 4.5 wt %, alternatively from 1.5 wt % to 4.0 wt %; and having a xylene soluble content measured at 25° C. lower than 10 wt %; alternatively lower than 8 wt %; alternatively lower than 7 wt %;
b) from 48 wt % to 88 wt %, alternatively from 57 wt % to 85 wt %; alternatively from 67 wt % to 80 wt %, of a propylene/ethylene copolymer having a content of ethylene derived units ranging from 15 wt % to 42 wt %; alternatively from 21.0 wt % to 35 wt % wherein the propylene composition has a melt flow rate (ISO 1133 230° C./2.16 kg) ranging from 0.5 to 20.0 g/10 min; alternatively from 1.0 to 10.0 g/10 min; alternatively from 1.3 to 5.0 g/10 min the sum of the amount of a) and b), being referred to the total weight % of a) and b) being 100 wt %; and the sum of the amount of T1), T2) and T3), being referred to the total weight % of T1), T2), and T3) being 100 wt %.

In some embodiments, the rigid polypropylene items of T1) are items having a volume lower or equal to 5 liters. In some embodiments, the rigid polypropylene items are selected from the group consisting of bottles, cups, and trays, including secondary components. In some embodiments, the secondary components are selected from the group consisting of lids and labels.

In some embodiments, components T1) are commercially available as recycled polypropylene. In some embodiments, the recycled polypropylene is sold by LyondellBasell under the tradename Moplen QCP300P. In some embodiments, the recycled polypropylene is further made from or containing other residues selected from the group consisting of glass, paper, board, cardboard, composite paper/cardboard materials, aluminized plastics, rubber, stones, wood, textiles, nappies, and compostable waste. In some embodiments, the composite paper/cardboard materials are liquid packaging boards. In some embodiments, the compostable waste is selected from the group consisting of food and garden waste.

In some embodiments, component T2) is a polypropylene random copolymer obtained by using Ziegler Natta catalyst. In some embodiments, the polypropylene random copolymer is commercially available under the tradename Hostalen H5416 from LyondellBasell.

In some embodiments, component T3) is propylene/ethylene copolymer composition being heterophasic obtained by sequential polymerization by using Ziegler Natta catalyst. In some embodiment, the heterophasic propylene/ethylene copolymer is commercially available under the tradename Adflex Q100F from LyondellBasell.

In some embodiments, the present disclosure provides a process for blow molding articles with the polypropylene composition containing recycled polypropylene.

In some embodiments, the present disclosure provides blow molding articles made from or containing the polypropylene composition.

In some embodiments, the blow molding articles are selected from the group consisting of bottles and tanks.

The following examples are given to illustrate, but not limit the present disclosure.

EXAMPLES

Characterizations

Xylene-Soluble (XS) Fraction at 25° C.

Solubility in xylene: Determined as follows:

2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid were poured in a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components B) and C) were calculated by using the formula:

$$XStot = WaXSA + WbXSB + WcXSC$$

wherein Wa, Wb and Wc were the relative amount of components A, B and C, respectively, and (A+B+C=1).

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Ethylene (C2) Content $^{13}$C NMR of Propylene/Ethylene Copolymers $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP = 100T_{\beta\beta}/S \quad PPE = 100T_{\beta\delta}/S \quad EPE = 100T_{\delta\delta}/S$$

$$PEP = 100S_{\beta\beta}/S \quad PEE = 100S_{\beta\delta}/S \quad EEE = 100(0.25S_{\gamma\delta} + 0.5S_{\delta\delta})/S$$

$$S = T_{\beta\beta} + T_{\beta\delta} + T_{\delta\delta} + S_{\beta\beta} + S_{\beta\delta} + 0.25S_{\gamma\delta} + 0.5S_{\delta\delta}$$

The molar percentage of ethylene content was evaluated using the following equation:

$$E \% \text{ mol} = 100*[PEP+PEE+EEE]$$

The weight percentage of ethylene content was evaluated using the following equation:

$$E \% \text{ wt.} = \frac{100*E \% \text{ mol} * MW_E}{E \% \text{ mol} * MW_E + P \% \text{ mol} * MW_P}$$

where P % mol is the molar percentage of propylene content, while $MW_E$ and $MW_P$ are the molecular weights of ethylene and propylene, respectively.

The product of reactivity ratio $r_1 r_2$ was calculated according to Carman (C. J. Carman, R. A. Harrington and C. E. Wilkes, Macromolecules, 1977; 10, 536) as:

$$r_1 r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of Propylene sequences was calculated as mm content from the ratio of the PPP mm $T_{\beta\beta}$ (28.90-29.65 ppm) and the whole $T_{\beta\beta}$ (29.80-28.37 ppm).

Ethylene C2 content of component b2 was measured by measuring the C2 content on component B) and then calculated by using the formula C2tot=Xb1C2b1+Xb2C2b2 wherein Xb1 and Xb2 are the amounts of components b1 and b2 in the composition.

Charpy impact test measured according to according to ISO 179-1eA, e ISO 1873-2.

Elongation at yield: measured according to ISO 527.
Elongation at break: measured according To ISO 527.
Stress at break: measured according to ISO 527.
Impact test: ISO 180-1A.
Samples for the mechanical analysis.
Samples were obtained according to ISO 1873-2:2007, excepting for the flexural modulus for which ISO 3167 was used.

Flexural Modulus

Determined according to ISO 178.

Melting Point and Crystallization Point

The melting point was measured by using a DSC instrument according to ISO 11357-3, at scanning rate of 20 C/min both in cooling and heating, on a sample of weight between 5 and 7 mg., under inert N2 flow. Instrument calibration was made with Indium.

T1 Component

T1 component was a recycled polypropylene, commercially available from LyondellBasell under the tradename QCP300P The T1 contained residue-drained, rigid, system-compatible items made of polypropylene, volume≤5 liters.

Purity was at least 94 wt %. Metallic and mineral impurities with a unit weight of >100 g and cartridges for sealants were not permitted.

Impurities

| | |
|---|---|
| Other metal items | <0.5% by mass |
| Rigid PE items | <1% by mass |
| Expanded plastics incl. EPS items | <0.5% by mass |
| Plastic films | <2% by mass |
| Other residues | <3% by mass |

Examples of other residues are:
Glass
Paper, Board, Cardboard
Composite paper/cardboard materials (for example, liquid packaging boards)
Aluminized plastics
Other materials (for example, rubber, stones, wood, textiles, nappies)
Compostable waste (for example, food, garden waste)

The Melt flow rate (230° C./2.16 kg) of T1 was 16 g/10 min, and the melting point was 150° C.

T2 Component

T2 component was commercial grade Hostalen H5416 sold by LyondellBasell

The properties of the copolymer are reported in Table 1:

TABLE 1

| | | |
|---|---|---|
| MFR 5 Kg/230° C. | g/10 min | 1.3 |
| Ethylene derived units | wt % | 4.0 |
| Poly dispersity (PI) | | 4.9 |
| X.S. | % | 8.7 |
| ISO Characterization | | |
| Flexural modulus 24 h | MPa | 870 |
| Tensile modulus 24 h | MPa | 850 |
| IZOD 0° C. 24 h | kj/m2 | 19 |
| Stress at yield | % | 27 |
| Elongation at break | kj/m2 | 482 |
| Tm | ° C. | 140 |

T3 Component

Components T3) was an heterophasic copolymer obtained by sequential gas phase polymerization, commercially available from LyondellBasell under the tradename Adflex Q100F. The features of the copolymer are reported on Table 2.

TABLE 2

| Component | | B |
|---|---|---|
| Component a | | |
| Split | % wt | 32 |
| C2 | % wt | 3.2 |
| Xylene solubles at 25° C. | % wt | <6.5 |
| Component b | | |
| Split | % wt | 68 |
| C2 | % wt | 27.0 |
| intrinsic viscosity of the xylene soluble fraction at 25° C. | dl/g | 3.2 |

* C2 = ethylene derived units

Components T1, T2 and T3 were blended together. The properties of the blend are reported in Table 3.

TABLE 3

| | | Ex1 | Comp ex 2 | Comp ex 3 |
|---|---|---|---|---|
| T2 | wt % | 50 | 50 | |
| T1 | wt % | 40 | 50 | |
| T3 | wt % | 10 | | |
| MFR | g/10 min | 2.9 | 2.7 | 1.8 |
| Charpy 23° C. 48 h | KJ/M2 | 46 | 12.3 | 34 |

TABLE 3-continued

|  |  | Ex1 | Comp ex 2 | Comp ex 3 |
|---|---|---|---|---|
| Charpy 0° C. 48 h | KJ/M2 | 5.9 | 3.5 | 5 |
| Tm | deg_C. | 155.2 | 155.9 | 143 |
| Tc | deg_C. | 121.8 | 122.5 | 108 |
| 1 l bottles |  |  |  |  |
| Drop tests | m (J) | 4.5 (47.7) | 1.7 (18) | 4.0 (41.1) |

Comparative example 3 was RB307MO, which was a propylene ethylene random copolymer sold by Borealis.

1-liter bottles with a weight of 30 grams were produced on a Krupp-Kautex KEB 4 single head machine using a one-cavity bottle mold with the following conditions:

Melt temperature 190° C.; mold temperature 12° C.; screw speed, rpm 18; die gap 650; cycle time, sec 13.5; air pressure, bar 6.5; and water pressure, bar 3.

Drop test was measured on sample bottles filled with water to ⅞ full. After conditioning for 2 hours at the temperature of the test (23° C.), the bottles fell from increasing height. The parameters reported in Table 3 were the height at which 50% of the bottles broke and the energy. 20 bottles were tested for each grade.

What is claimed is:

1. A polypropylene composition comprising:
   T1) 35-65 wt % of a recycled polypropylene mixture containing at least 80 wt % of rigid-polypropylene items and having a purity of at least 90 wt %, wherein the remaining 10 wt % comprises other polymers, paper, cardboard, carton, aluminized plastic, and textiles; wherein the recycled polypropylene mixture has a melt flow rate (ISO 1133 230° C./2.16 kg) ranging between 2 and 30 g/10 min and a melting point measured by DSC ranging from 148° C. to 162° C.;
   T2) 20-50 wt % of an ethylene propylene copolymer having
      i) a content of ethylene derived units between 1.0 wt % and 8.0 wt %;
      (ii) a melting temperature ranging from 135° C. to 155° C.;
      (iii) a melt flow rate (ISO 1133 230° C./5 kg. ISO 1133) ranging from 0.2 g/10 min to 3.5 g/10 min; and
      (iv) xylene solubles at 25° C. ranging from 10.0 wt % to 4.0 wt %; and
   T3) 5-20 wt % of a propylene/ethylene heterophasic copolymer composition having an intrinsic viscosity on a xylene soluble fraction measured at 25° C. ranging from 2.5 dl/g to 4.5 dl/g and comprising:
      a) from 12 wt % to 52 wt % of a propylene homopolymer or a propylene/ethylene copolymer having a content of ethylene derived units ranging from 0.1 wt % to 4.5 wt %; and having a xylene soluble content measured at 25° C. lower than 10 wt %; and
      b) from 48 wt % to 88 wt % of a propylene ethylene copolymer having a content of ethylene derived units ranging from 15 wt % to 42 wt %;
   wherein the propylene composition has a melt flow rate (ISO 1133 230° C./2.16 kg) ranging from 0.5 to 20 g/10 min;
   the sum of the amount of a) and b), being referred to the total weight % of a), and b) being 100 wt %; and the sum of the amount of T1), T2) and T3), being referred to the total weight % of T1), T2), and T3) being 100 wt %.

2. The polypropylene composition according to claim 1, wherein:
   component T1 ranges from 40% by weight to 60% by weight;
   component T2 ranges from 25% by weight to 45% by weight; and
   component T3 ranges from 7% by weight to 15% by weight.

3. The polypropylene composition according to claim 1, wherein
   Component T1 ranges from 45% by weight to 55% by weight;
   Component T2 ranges from 32% by weight to 42% by weight; and
   Component T3 ranges from 8% by weight to 13% by weight.

4. The polypropylene composition according to claim 1, wherein component T1 contains at least 85 wt % of rigid polypropylene items and having a purity of at least 92 wt %, wherein the remaining 8 wt % comprises other polymers, paper, cardboard, carton, aluminized plastic, and textiles.

5. The polypropylene composition according to claim 1, wherein component T1-contains at least 90 wt % of rigid polypropylene items and having a purity of at least 94 wt %, wherein the remaining 6 wt % comprises other polymers, paper, cardboard, carton, aluminized plastic, and textiles.

6. The polypropylene composition according to claim 1, wherein component T2 is a copolymer of ethylene and propylene containing from 2.0% to 6.0% by weight of ethylene units.

7. The polypropylene composition according to claim 1, wherein component T2 is a copolymer of ethylene and propylene containing from 3.0% to 5.0% by weight of ethylene units.

8. The polypropylene composition according to claim 1, wherein, in component T2, the xylene solubles at 25° C. ranges from 9.0 wt % to 6.0 wt %.

9. The polypropylene composition according to claim 1, wherein component T2 has a melt flow rate (230° C./5 kg ISO 1133) from 0.6 to 2.0 g/10m.

10. The polypropylene composition according to claim 1, wherein, in component T3, component a) ranges from 15 wt % to 43 wt % and component b) ranges from 57 wt % to 85 wt %.

11. The polypropylene composition according to claim 1, wherein, in component T3), component a) is a propylene ethylene copolymer having an ethylene derived units content ranging from 1.5 wt % to 4.0 wt %.

12. The polypropylene composition according to claim 1, wherein, in component T3), component b) has ethylene derived units content ranging from 21.0 wt % to 35.0 wt %.

13. The polypropylene composition according to claim 1, having a melt flow rate (ISO 1133 230° C./2.16 kg) ranging from 1.0 to 10.0 g/10 min.

14. A blow molding article comprising the polypropylene composition of claim 1.

15. A blow molding article according to claim 14, wherein the article is a bottle.

* * * * *